US012679305B2

(12) United States Patent
Otero Fafián et al.

(10) Patent No.: US 12,679,305 B2
(45) Date of Patent: Jul. 14, 2026

(54) MOBILE ACCESS SYSTEM FOR GRANTING ACCESS TO A DEVICE

(71) Applicant: Volkswagen Aktiengesellschaft, Wolfsburg (DE)

(72) Inventors: Raúl Otero Fafián, Hannover (DE); André Schwaß, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 132 days.

(21) Appl. No.: 18/774,844

(22) Filed: Jul. 16, 2024

(65) Prior Publication Data

US 2025/0026308 A1     Jan. 23, 2025

(30) Foreign Application Priority Data

Jul. 20, 2023     (DE) .......................... 102023206920.2

(51) Int. Cl.
*B60R 25/24*          (2013.01)
*B60R 25/30*          (2013.01)
*G07C 9/00*           (2020.01)

(52) U.S. Cl.
CPC .............. *B60R 25/24* (2013.01); *B60R 25/30* (2013.01); *G07C 9/00309* (2013.01); *B60R 2325/20* (2013.01)

(58) Field of Classification Search
CPC .... H04W 4/46; G01S 13/931; B60R 2325/20; B60R 25/241; G07C 2209/63
See application file for complete search history.

(56) References Cited

U.S. PATENT DOCUMENTS

| | | | | |
|---|---|---|---|---|
| 9,478,088 B2 * | 10/2016 | Lee | .................... | G07C 9/00182 |
| 11,417,163 B2 * | 8/2022 | Chen | ................. | G07C 9/00309 |
| 2010/0052931 A1 | 3/2010 | Kolpasky et al. | | |
| 2014/0379175 A1 | 12/2014 | Mittermeier | | |

(Continued)

FOREIGN PATENT DOCUMENTS

| | | |
|---|---|---|
| CN | 205750931 U | 11/2016 |
| DE | 102009052078 A1 | 5/2011 |
| DE | 102016112548 A1 | 1/2018 |

(Continued)

OTHER PUBLICATIONS

Priority German Application No. 102023206920.2. Office Action (Jan. 9, 2024).

*Primary Examiner* — Sisay Yacob
(74) *Attorney, Agent, or Firm* — Peter Zura; LOZA & LOZA, LLP

(57)          ABSTRACT

A mobile access system for granting access to a device, particularly a vehicle, is disclosed. The system includes a transmitter unit for wirelessly transmitting an unlock signal, a sensor unit with a gyroscopic sensor for detecting movement, and a control unit connected to the sensor unit. The control unit receives sensor data, recognizes a sequence of movements, checks if it matches a predefined first sequence, and unblocks the system if there is a match, enabling the unlock signal transmission only in the unblocked state. The system may also include an input unit for additional user input and an indication element for user feedback. It can block the system based on a second predefined sequence. A method for granting access using this mobile access system is also described.

20 Claims, 2 Drawing Sheets

(56) References Cited

U.S. PATENT DOCUMENTS

2015/0042454 A1* 2/2015 Lee ................... G07C 9/00182
340/5.72
2020/0219338 A1* 7/2020 Chen ................... B60R 25/002

FOREIGN PATENT DOCUMENTS

| DE | 102016225284 | A1 | 6/2018 |
|----|----|----|----|
| EP | 1447775 | A2 | 8/2004 |
| WO | 2016139301 | A1 | 9/2016 |

* cited by examiner

MOBILE ACCESS SYSTEM FOR GRANTING ACCESS TO A DEVICE

RELATED APPLICATIONS

The present application claims priority to German Patent App. No. 102023206920.2, to Otero Fañan et al., titled "Mobile Access System For Granting Access To A Device", filed on Jul. 20, 2022, the contents of which is incorporated by reference in its entirety herein.

TECHNICAL FIELD

The present disclosure relates to a mobile access system, such as a vehicle key, for granting access to a device, in particular to a vehicle. The present disclosure also relates to a corresponding method.

BACKGROUND

Mobile access systems, such as vehicle keys, allow users to wirelessly access and control devices like vehicles. These systems enable a device to be locked or unlocked remotely, enhancing convenience and security. For instance, a vehicle can be locked or unlocked wirelessly using a vehicle key.

Ensuring unauthorized access prevention is crucial, especially for vehicles, to avoid theft. Existing theft protection mechanisms often use ultra-wideband (UWB) sensors integrated into vehicle keys. These sensors determine the distance between the key and the vehicle by measuring the propagation time of radio signals. In cases where radio extenders are used-commonly in vehicle theft attempts—the vehicle becomes unresponsive to unauthorized signals. However, if the vehicle key is lost or stolen, a third party could gain access to the vehicle.

DE 10 2016 112 548 A1 describes a method for operating a passive access system for motor vehicles. This system uses an ID transmitter to unlock and lock the vehicle via radio communication, particularly in the LF range, with a control unit installed in the vehicle.

DE 10 2009 052 078 A1 discusses a portable remote-control device for vehicles, equipped with an acceleration sensor. This sensor detects the movement of the remote-control device and outputs corresponding acceleration data.

SUMMARY

The present disclosure aims to provide a mobile access system and method that address the aforementioned drawbacks, offering enhanced security against unauthorized access.

The primary aspects of this disclosure are detailed in the independent claims below. Additional aspects are described in the dependent claims, along with the accompanying description and figures.

In some examples, a mobile access system for granting access to a device includes a transmitter unit for wirelessly transmitting an unlock signal to the device. It also includes a sensor unit for detecting the movement of the mobile access system in space and a control unit connected to the sensor unit. The control unit is designed to receive sensor data from the sensor unit, recognize a sequence of movements of the mobile access system based on the received sensor data, determine whether the recognized sequence of movements matches a predefined first sequence of movements, and unblock the mobile access system if the recognized sequence matches the predefined sequence. The transmission of the unlock signal to the device is only enabled in the unblocked state of the mobile access system.

In some examples, a method for granting access to a device via a mobile access system includes receiving sensor data from a sensor unit of the mobile access system, recognizing a sequence of movements of the mobile access system based on the received sensor data, determining whether the recognized sequence matches a predefined first sequence of movements, and unblocking the mobile access system if the recognized sequence matches the predefined sequence. The transmission of an unlock signal to the device is only enabled in the unblocked state of the mobile access system.

The control unit of the mobile access system is designed to implement this method, allowing the method to be executed using the mobile access system. The mobile access system and its associated method are described together hereafter, with explanations for the mobile access system or its control unit applying similarly to the method, and vice versa.

The various specific embodiments described in this application can be advantageously combined unless otherwise indicated for specific cases.

BRIEF DESCRIPTION OF THE DRAWINGS

The present disclosure will be described hereafter in exemplary embodiments based on the associated drawings. In the schematic drawings.

DETAILED DESCRIPTION

Figure 1:
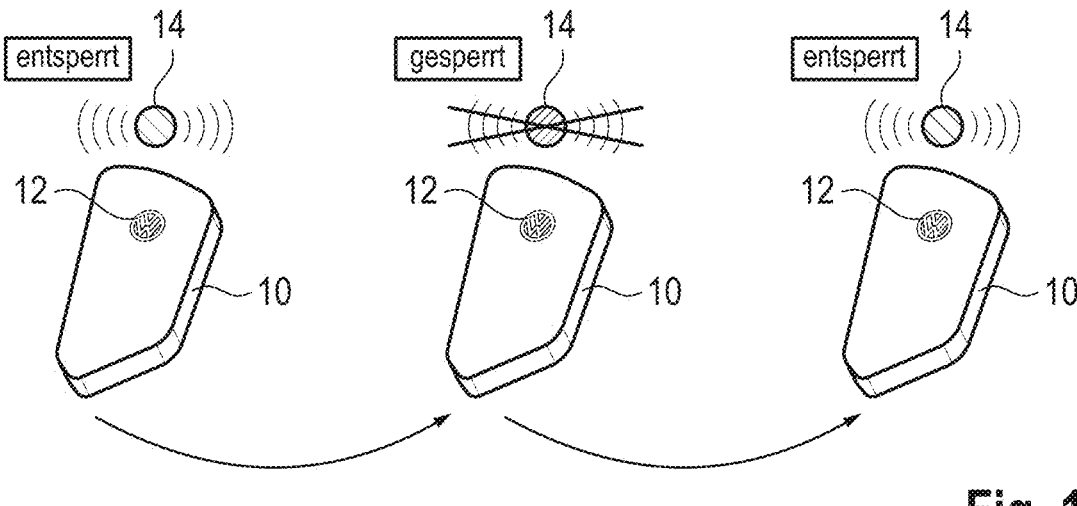
FIG. 1 illustrates a mobile access system in the unblocked state as well as in the blocked state, according to some aspects of the present disclosure.

Unless indicated otherwise, identical objects are denoted hereafter by identical reference numerals.

The mobile access system described here overcomes at least some of the drawbacks mentioned earlier by only unblocking through a predefined, personalized sequence of movements. This sequence of movements refers to a trajectory in space, such as a gesture made by the user's hand while holding the mobile access system. When the user performs this predefined sequence, the system transitions from a blocked state to an unblocked state. Only in the unblocked state can the system emit the unlock signal for the device. Thus, if the mobile access system remains blocked, it cannot unlock the device, preventing unauthorized access even if the system is stolen.

The mobile access system allows a user to access the device by wirelessly transmitting an unlock signal. It can also transmit a lock signal to secure the device. The transmitter unit, which is typically a radio unit, may form part of a transceiver that receives radio signals as well. An operating unit, such as a key, may be included to trigger the transmitter unit to send the unlock or lock signal. The system can also automatically emit these signals when it is within a certain distance from the device. For instance, a vehicle key can wirelessly unlock and lock a vehicle.

The sensor unit of the mobile access system includes one or more sensors to detect movement in three-dimensional space, often featuring a gyroscopic sensor and possibly an acceleration sensor. The control unit, connected to the sensor unit, uses this data to determine the movement sequence of the mobile access system.

The control unit, which includes a processor, carries out the method described. This unit uses a stored computer program to execute the required steps, including activating the transmitter unit to emit the unlock or lock signals.

The control unit receives sensor data from the transmitter unit, such as measurements from a gyroscopic sensor. It evaluates this data to identify the sequence of movements and continuously monitors the mobile access system's movements. The control unit compares these movements to a predefined first sequence stored in the system's memory, which may be set at the factory or personalized by the user.

If the recognized sequence matches the stored first sequence, the control unit unblocks the system, enabling the transmission of the unlock signal. In the blocked state, the transmitter unit is deactivated to save energy, and the unlock signal cannot be emitted. Thus, the system can only be used to unlock the device after performing the correct sequence of movements, enhancing security.

In some examples, the mobile access system is a vehicle key, granting access to a vehicle or an associated unit like a roof box or bicycle rack. Here, the vehicle can only be unlocked if the user performs the predefined sequence of movements with the key, significantly increasing theft protection.

In some examples, the control unit also determines if a recognized sequence matches a predefined second sequence of movements, which blocks the system and disables the unlock signal transmission. This feature allows the same or different sequences to be used for blocking and unblocking, enhancing security and ease of use.

In some examples, the transmitter unit is activated only in the unblocked state to save energy, extending the life of the system's battery.

In some examples, the system includes an indicator element that provides feedback to the user when the system is unblocked or blocked. This indicator could be a light source, such as an LED, emitting different signals for unblocking and blocking, like green for unblocking and red for blocking.

In some examples, the system includes an input unit for additional security, requiring a predefined user input in conjunction with the movement sequence to unlock the system. This prevents accidental unblocking or blocking if the user inadvertently performs the sequence of movements.

In some examples, the sequences of movements can be personalized, either by selecting from predefined options or by the user performing and storing a unique gesture. Personalization is only possible in the unblocked state, further enhancing security by making it difficult for unauthorized parties to determine the necessary movements for unblocking or blocking the system.

Figure 2:
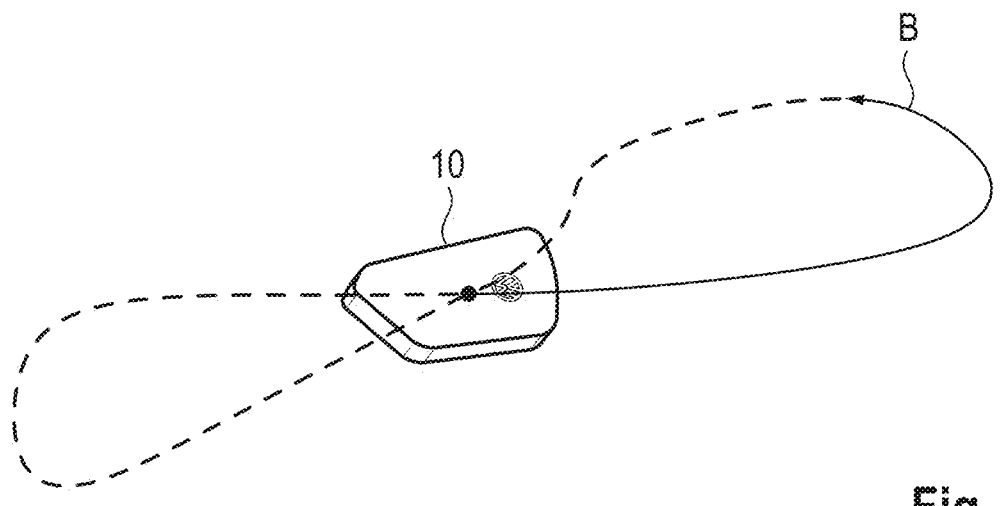
FIG. 2 shows a sequence of movements to be carried out for unblocking and/or blocking the mobile access system, according to some aspects of the present disclosure.
Figure 3:
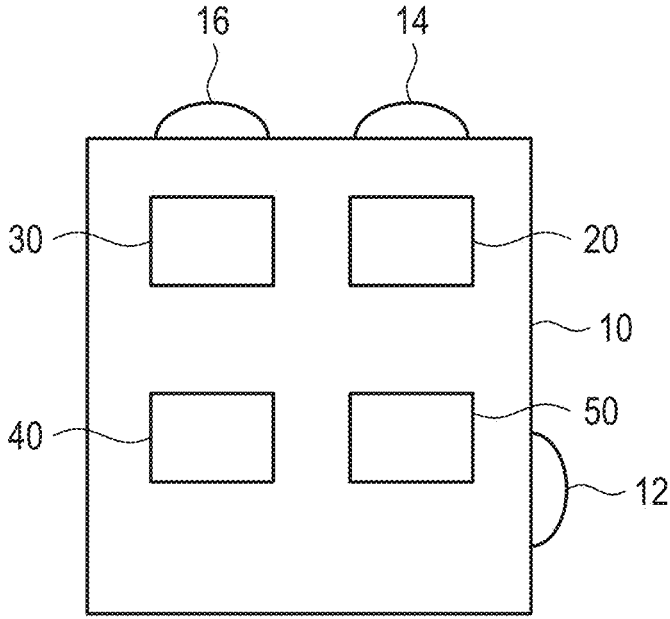
FIG. 3 shows a mobile access system, according to some aspects of the present disclosure.

FIGS. 1 to 3 illustrate an example of a mobile access system 10 for granting access to a device, such as a vehicle. In this example, the mobile access system is a vehicle key, and the device is a vehicle.

The vehicle key 10 includes an operating element 12, a transmitter unit 20 for wirelessly transmitting an unlock signal as well as a lock signal to the vehicle in response to the actuation of the operating element 12. It also includes a sensor unit 30 for recognizing the movement of the vehicle key 10 in space, a memory unit 50, and a control unit 40 connected to the sensor unit 30, the transmitter unit 20, and the memory unit 50. Additionally, the vehicle key 10 has an indication element 14, designed as an LED, and an input unit 16 for receiving user input, which is designed as an operating key, as shown in FIG. 3.

The vehicle can be locked and unlocked in the usual manner using the vehicle key 10 by the user actuating the operating element 12. The unlock signal and/or the lock signal are emitted by the transmitter unit 20 when the operating element 12 is actuated. The unlock and lock signals may be identical.

However, the vehicle key 10 only allows the emission of these signals when it is in an unblocked state. In the blocked state, the emission of the unlock and lock signals is disabled. The vehicle key 10 can only transition between the blocked and unblocked states through a predefined sequence of movements.

The control unit 40 monitors the movement of the vehicle key 10 by evaluating the sensor data from the sensor unit 30, which may include a gyroscope. The control unit 40 compares the recognized sequence of movements to predefined sequences stored in the memory unit 50 and unblocks or blocks the vehicle key 10 accordingly.

FIG. 1 shows the vehicle key 10 in its unblocked state on the left, indicated by the LED 14 illuminated in green. In this state, the user can lock the vehicle by actuating the operating element 12.

When the user performs the predefined sequence of movements, the vehicle key 10 transitions to the blocked state, shown in the center of FIG. 1. The arrow between the left and center images indicates the sequence of movement. The blocked state is indicated by the LED 14 illuminated in red. In the blocked state, actuating the operating element 12 has no effect, and the vehicle remains locked.

If the user repeats the predefined sequence of movements, the vehicle key 10 switches back to the unblocked state, shown on the right in FIG. 1. The user can then unlock the vehicle by actuating the operating element 12, as the transmitter unit 20 emits the unlock signal in this state.

FIG. 2 shows an example of a predefined sequence of movements B for the vehicle key 10, representing an "8." Other sequences of movements can also be programmed.

This system achieves a higher degree of security against unauthorized access to the vehicle because only the authorized user knows the sequence of movements needed to unblock (and block) the vehicle key. An unauthorized third party who does not know this sequence cannot use the vehicle key.

Preferably, actuating the operating key 16 is also required to unblock or block the vehicle key 10. For example, blocking or unblocking the vehicle key 10 only occurs if the user has previously pressed the operating key 16 or holds it down while performing the predefined sequence of movements. This prevents inadvertent unblocking or blocking of the vehicle key 10 if the sequence of movements is performed accidentally.

LIST OF REFERENCE SIGNS 10 mobile access system/vehicle key
12 operating element
14 indication element/LED
16 input unit/operating key
20 transmitter unit
30 sensor unit
40 control unit
50 memory unit
B sequence of movements

The invention claimed is:

1. A mobile access system for granting access to a device, the mobile access system comprising:
  a transmitter unit for wirelessly transmitting an unlock signal to the device for unlocking the device;
  a sensor unit comprising a gyroscopic sensor for recognizing a movement of the mobile access system in space; and
  a control unit connected to the sensor unit, the mobile access system having a blocked state and an unblocked state, wherein transmission of the unlock signal to the device is disabled in the blocked state and enabled in the unblocked state, the control unit being configured to:
    receive sensor data from the sensor unit;
    recognize, based on the sensor data received from the gyroscopic sensor, a sequence of movements of the mobile access system in space;
    determine whether the recognized sequence of movements is consistent with a predefined first sequence of movements; and
    place the mobile access system into the unblocked state when the recognized sequence of movements is consistent with the predefined first sequence of movements.

2. The mobile access system of claim 1, wherein mobile access system is a vehicle key for granting access to a vehicle and/or a unit associated with the vehicle.

3. The mobile access system of claim 1, wherein the control unit is further configured to:
  determine whether the recognized sequence of movements is consistent with a predefined second sequence of movements; and
  block the mobile access system when the recognized sequence of movements is consistent with the predefined second sequence of movements,
  wherein the transmission of an unlock signal to the device is disabled in the blocked state of the mobile access system.

4. The mobile access system of claim 3, wherein the second sequence of movements differs from the first sequence of movements.

5. The mobile access system of claim 1, wherein the transmitter unit is only activated in the unblocked state of the mobile access system.

6. The mobile access system of claim 1, further comprising an indication element for outputting an unblock confirmation to the user, wherein the control unit is configured to
  activate the indication element to output the unblock confirmation to the user when the mobile access system has been unblocked.

7. The mobile access system of claim 6, wherein the indication element comprises a light source, the light source emitting a light signal as the unblock confirmation based on the activation by the control unit.

8. The mobile access system of claim 1, further comprising an input unit for receiving a user input, wherein the control unit is configured to:
  recognize whether the input unit receives a predefined first user input; and
  unblock the mobile access system when the recognized sequence of movements is consistent with the predefined first sequence of movements and when the predefined first user input was recognized.

9. The mobile access system of claim 1, wherein the first sequence of movements comprises a personalized sequence of movements.

10. A method for granting access to a device using a mobile access system, the method comprising:
  receiving sensor data from a sensor unit of the mobile access system, the sensor unit comprising a gyroscopic sensor for recognizing a movement of the mobile access system in space;
  recognizing, based on the sensor data received from the gyroscopic sensor, a sequence of movements of the mobile access system in space;
  determining whether the recognized sequence of movements is consistent with a predefined first sequence of movements; and
  placing the mobile access system into an unblocked state when the recognized sequence of movements is consistent with the predefined first sequence of movements,
  wherein the mobile access system has a blocked state and the unblocked state, and wherein transmission of an unlock signal to the device is disabled in the blocked state and enabled in the unblocked state.

11. The method of claim 10, wherein the mobile access system is a vehicle key for granting access to a vehicle and/or a unit associated with the vehicle.

12. The method of claim 10, further comprising:
  determining whether the recognized sequence of movements is consistent with a predefined second sequence of movements; and
  blocking the mobile access system when the recognized sequence of movements is consistent with the predefined second sequence of movements,
  wherein the transmission of an unlock signal to the device is disabled in the blocked state of the mobile access system.

13. The method of claim 12, wherein the second sequence of movements differs from the first sequence of movements.

14. The method of claim 10, wherein the transmitter unit of the mobile access system is only activated in the unblocked state of the mobile access system.

15. The method of claim 10, further comprising activating an indication element to output an unblock confirmation to the user when the mobile access system has been unblocked.

16. The method of claim 15, wherein the indication element comprises a light source, the light source emitting a light signal as the unblock confirmation based on the activation by the control unit.

17. The method of claim 10, further comprising:
  determining whether an input unit of the mobile access system receives a predefined first user input; and
  unblocking the mobile access system when the recognized sequence of movements is consistent with the predefined first sequence of movements and when the predefined first user input was recognized.

18. The method of claim 10, wherein the first sequence of movements comprises a personalized sequence of movements.

19. A system for controlling access to a secured area, the system comprising:
  a transmitter unit for wirelessly transmitting an access signal to the secured area for granting access;
  a sensor unit comprising a gyroscopic sensor for detecting a movement of the system; and
  a control unit connected to the sensor unit, wherein the system has a blocked state and an unblocked state, and wherein transmission of the access signal to the secured area is disabled in the blocked state and enabled in the unblocked state, the control unit being configured to:

receive data from the sensor unit;

recognize, based on the sensor data received from the gyroscopic sensor, a movement pattern of the system;

determine whether the recognized movement pattern matches a predefined movement pattern; and transition the system to the unblocked state when the recognized movement pattern matches the predefined movement pattern.

20. The system of claim 19, wherein the sensor unit comprises at least one of a gyroscopic sensor or an accelerometer for detecting the movement of the system in three-dimensional space.

* * * * *